(12) United States Patent
Song et al.

(10) Patent No.: US 9,786,058 B2
(45) Date of Patent: Oct. 10, 2017

(54) METHOD AND SYSTEM FOR SEGMENTATION OF VASCULAR STRUCTURE IN A VOLUMETRIC IMAGE DATASET

(71) Applicant: SONY CORPORATION, Tokyo (JP)

(72) Inventors: Bi Song, San Jose, CA (US); Ming-Chang Liu, San Jose, CA (US)

(73) Assignee: SONY CORPORATION, Tokyo (JP)

( * ) Notice: Subject to any disclaimer, the term of this patent is extended or adjusted under 35 U.S.C. 154(b) by 60 days.

(21) Appl. No.: 15/018,442

(22) Filed: Feb. 8, 2016

(65) Prior Publication Data

US 2017/0228868 A1 Aug. 10, 2017

(51) Int. Cl.
*G06T 5/00* (2006.01)
*G06T 7/00* (2017.01)

(52) U.S. Cl.
CPC ............ *G06T 7/0097* (2013.01); *G06T 5/002* (2013.01); *G06T 7/0012* (2013.01); *G06T 2207/10088* (2013.01); *G06T 2207/20156* (2013.01); *G06T 2207/30101* (2013.01)

(58) Field of Classification Search
CPC ..... G06T 7/0097; G06T 5/002; G06T 7/0012; G06T 2207/10088; G06T 2207/20156; G06T 2207/30101
USPC ........................................................ 382/128
See application file for complete search history.

(56) References Cited

U.S. PATENT DOCUMENTS

| 8,068,655 | B2 | 11/2011 | Odry et al. |
| 8,126,232 | B2 | 2/2012 | Dikici et al. |
| 8,170,304 | B2 | 5/2012 | Tek et al. |
| 2014/0081129 | A1* | 3/2014 | Lu .................... G06T 7/0012 600/424 |

OTHER PUBLICATIONS

Cemil Kirbas et al, "A Review of Vessel Extraction Techniques and Algorithms", ACM Computing Surveys, Jun. 1, 2004, pp. 42, vol. 36, Issue: 2, New York, USA.
Jiaoying Jin et al, "Vascular Tree Segmentation in Medical Images Using Hessian-Based Multiscale Filtering and Level Set Method", Computational and Mathematical Methods in Medicine, Oct. 22, 2013, pp. 10, vol. 2013, Article ID 502013.

(Continued)

*Primary Examiner* — Amandeep Saini
(74) *Attorney, Agent, or Firm* — Chip Law Group (57) ABSTRACT

Various aspects of a method and a system for segmentation of vascular structure in a volumetric image dataset are disclosed herein. The method comprises initial segmentation of an input volumetric image dataset to obtain a main vessel structure and a plurality of broken segments. A weighted path is computed between the main vessel structure and a broken segment of the plurality of broken segments. The computation of the weighted path is based on at least one or more parameters associated with a first voxel of the broken segment and a second voxel of the main vessel structure. A valid, weighted path is determined between the main vessel structure and a broken segment of the plurality of broken segments, based on the computed weighted path and one or more pre-specified conditions. Based on the determined valid, weighted path, an output volumetric image dataset is generated by performance of a final segmentation on a gradient field.

20 Claims, 7 Drawing Sheets

(56) References Cited

OTHER PUBLICATIONS

Meng Li et al, "Segmentation and Tracking of Coronary Artery Using Graph-Cut in CT Angiographic", IEEE, Second International Conference on Biomedical Engineering and Informatics, Oct. 17-19, 2009, pp. 4, ISBN: 978-1-4244-4132-7, Tianjin.
Ying-Che Tsai et al, "Adaptive Segmentation of Vessels From Coronary Angiograms Using Multi-Scale Filtering", IEEE, Nternational Conference on Signal-Image Technology and Internet-Based Systems, Dec. 2-5, 2013, pp. 5, ISBN: 978-1-4799-3211-5, Kyoto.

* cited by examiner

FIG. 4

METHOD AND SYSTEM FOR SEGMENTATION OF VASCULAR STRUCTURE IN A VOLUMETRIC IMAGE DATASET

CROSS-REFERENCE TO RELATED APPLICATIONS/INCORPORATION BY REFERENCE

None.

FIELD

Various embodiments of the disclosure relate to segmentation of vascular structure in a volumetric image dataset. More specifically, various embodiments of the disclosure relate to segmentation of vascular structure in a volumetric image dataset of an anatomical portion of a human subject.

BACKGROUND

With recent advancements in the medical sciences, various automated radiological diagnostic procedures may be performed on anatomical structures to generate various advanced medical imaging modalities, such as three-dimensional (3D) Magnetic Resonance Angiography (MRA) volume data. MRA is a non-invasive medical imaging modality that produces 3D images of vessels of the anatomical structures.

The medical imaging modalities thus obtained may be post-processed by use of a two-dimensional (2D) and/or 3D image segmentation procedure employed for tube-like anatomical structures obtained from 3D volume data. Such an image segmentation procedure may generate a fine vascular structure of an anatomical region that may be utilized by users, such as a physician, for the diagnosis of various vascular abnormalities, such as stenosis or malformation.

In certain scenarios, the image segmentation procedure may require user intervention for initialization of seed points in an input volumetric data, such as the MRA volume data. Such initialization may include manual selection of seed points and a threshold value. Further, the selection may be performed in multiple passes to extract the fine vascular structure of the anatomical region from the input volume data. The extraction of the fine vascular structure off the anatomical region may be an arduous and imprecise process. Such user interventions to provide multiple selections of seed points and threshold values in multiple passes may be cumbersome for the user.

In other scenarios, a detailed view of the extracted fine vascular structure may be occluded due to multiple instances of overlap of vessel segments within an anatomical region. The extracted fine vascular structure may include noise components and similar intensity values of other non-vascular structures. Hence, there is a need of an enhanced and accurate vessel segmentation procedure that may automatically initiate the seed points and threshold values and extract the fine vascular structure in a single pass for clinical diagnosis and quantitative analysis of the vascular structure.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

A method and a system are provided for segmentation of vascular structure in a volumetric image dataset substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

The following described implementations may be found in the disclosed method and system for segmentation of vascular structure in the volumetric image dataset. Exemplary aspects of the disclosure may include a method to perform an initial segmentation of an input volumetric image dataset, by an image-processing server. The initial-segmentation may be performed to obtain a main vessel structure and a plurality of broken segments. The method may further include computation of a weighted path between the main vessel structure and a broken segment of the plurality of broken segments. The computation may be based on at least one or more parameters associated with a first voxel of the broken segment of the plurality of broken segments and a second voxel of the main vessel structure. The method may further include determination of a valid weighted path between the main vessel structure and a broken segment of the plurality of broken segments, based on the computed weighted path and one or more pre-specified conditions. A final segmentation may be performed to generate an output volumetric image dataset.

In accordance with an embodiment, an enhancement of the input volumetric image dataset may be performed by use of one or more image enhancement techniques. The one or more image enhancement techniques may comprise a top-hat transformation, bottom-hat transformation, opening morphology, closing morphology, and/or histogram equalization. A scalp-removal operation may be further performed on the input volumetric image dataset based on a distance to head boundary criteria.

In accordance with an embodiment, the input volumetric image dataset may be filtered to obtain a smoothed volumetric image dataset. A threshold may be applied to the smoothed volumetric image dataset to obtain a binary volumetric image dataset, based on a pre-defined threshold value. A vector difference may be determined between a first gradient vector and a second gradient vector. The first gradient vector may correspond to the smoothed volumetric image dataset and the second gradient vector may correspond to the binary volumetric image dataset. The gradient field may be generated based on the determined vector difference.

In accordance with an embodiment, a graph that comprises a plurality of first nodes, a plurality of second nodes, and a plurality of edges, may be generated. In such a case, a first node from the plurality of first nodes may correspond to the first voxel of the broken segment of the plurality of broken segments. A second node from the plurality of second nodes may correspond to the second voxel of the main vessel structure. Each of the plurality of edges may correspond to the computed weighted path. The computed valid, weighted path may be the shortest path between the first voxel of the main vessel structure and the second voxel of the broken segment.

In accordance with an embodiment, the computed weighted path may be based on at least one or more parameters associated with the first voxel of the broken segment of the plurality of broken segments and the second voxel of the main vessel structure. The broken segment of the plurality of broken segments may be connected to the main vessel structure, via the determined computed weighted path.

In accordance with an embodiment, the one or more parameters comprise an intensity of the first voxel, an intensity of the second voxel, and a measure of similarity between the first voxel and one or more neighbor voxels associated with the first voxel. In accordance with an embodiment, the one or more pre-specified conditions may comprise a first condition based on which a length of the broken segment exceeds a length of the computed weighted path. In accordance with an embodiment, the one or more pre-specfied conditions further comprise a second condition for which an angle between the computed weighted path and the main vessel structure is less than a pre-defined threshold angle value.

Figure 1:
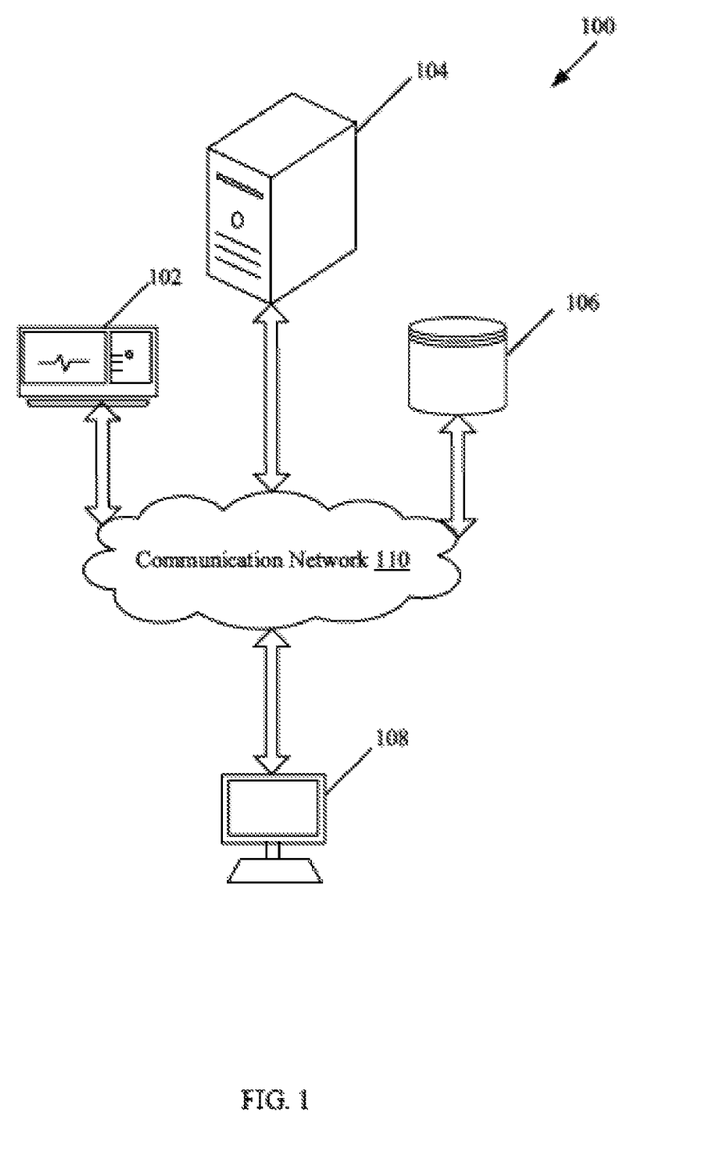
FIG. 1 is a block diagram that illustrates a network environment for the segmentation of vascular structure in a volumetric image dataset, in accordance with an embodiment of the disclosure.

FIG. 1 is a block diagram that illustrates a network environment for segmentation of vascular structure in a volumetric image dataset (VID), in accordance with an embodiment of the disclosure. With reference to FIG. 1, there is shown a network environment 100. The network environment 100 may include a medical imaging device 102, an image-processing server 104, an image database 106, a user terminal 108, and a communication network 110. The medical imaging device 102 may be communicatively coupled to the image-processing server 104, the image database 106, and the user terminal 108, via the communication network 110.

The medical imaging device 102 may comprise suitable logic, circuitry, interfaces, and/or code that may be configured to generate visual representations of a captured input VID. The captured input VID may correspond to an anatomical portion of a subject, such as human body, for clinical analysis and medical intervention. Examples of the medical imaging device 102 may include, but are not limited to, a medical resonance angiography (MRA) scanner, a computed tomography (CT) scanner, and/or a regular x-ray scanner.

The image-processing server 104 may comprise suitable logic, circuitry, interfaces, and/or code that may be configured to provide image-processing services to one or more subscribed electronic devices, such as the user terminal 108 and/or the medical imaging device 102. In accordance with an embodiment, the image-processing server 104 may be configured to analyze the input VID captured by the medical imaging device 102. In accordance with an embodiment, the image-processing server 104 may be implemented as a plurality of cloud-based resources by use of several technologies that are well known to those skilled in the art. Further, the image-processing server 104 may be associated with a single or multiple service providers. Examples of the one or more servers may include, but are not limited to, Apache™ HTTP Server, Microsoft® Internet Information Services (IIS), IBM® Application Server, Sun Java™ System Web Server, and/or a file server.

A person with ordinary skill in the art will understand that the scope of the disclosure is not limited to implementation of the image-processing server 104 and the medical imaging device 102 as separate entities. In accordance with an embedment, the functionalities of the image-processing server 104 may be implemented within the medical imaging device 102, without departure from the scope of the disclosure.

The image database 106 may store a repository of one or more image frames captured by the medical imaging device 102. In accordance with an embodiment, the image database 106 may be communicatively coupled to the image-processing server 104. The image database 106 may receive the input VID, via the image-processing server 104, when the medical imaging device 102 captures the input VID. In accordance with an embodiment, the image database 106 may be implemented by use of various database technologies known in the art. Examples of the image database 106 may include, but are not limited to, Microsoft® SQL Server, Oracle®, IBM DB2®, Microsoft Access®, PostgreSQL®, MySQL®, and/or SQLite®. In accordance with an embodiment, the image-processing server 104 may connect to the image database 106, based on one or more protocols. Examples of such one or more protocols may include, but are not limited to, Open Database Connectivity (ODBC)® protocol and Java Database Connectivity (JDBC)® protocol.

A person with ordinary skid in the art will understand that the scope of the disclosure is not limited to implementation of the image-processing server 104 and the image database 106 as separate entities. In accordance with an embodiment, functionalities of the image database 106 may be implemented by the image-processing server 104, without departure from the scope of the disclosure.

The user terminal 108 may comprise suitable logic, circuitry, interfaces, and/or code that may be configured to present a user interface (UI) to display the input VID to a user, such as a physician. In accordance with an embodiment, the user terminal 108 may be configured to display the input VID in real time, while a surgical or diagnostic procedure is performed on the anatomical region of the patient. The user terminal 108 may be further configured to display the one or more surgical tools that are localized in each image of the input VID by the image-processing server 104. Examples of the user terminal 108 may include, but are not limited to, a smartphone, a camera, a tablet computer, a laptop, a wearable electronic device, a television, an Internet Protocol Television (IPTV), and/or a Personal Digital Assistant (PDA) device.

A person with ordinary skill in the art will understand that the scope of the disclosure is not limited to implementation of the user terminal 108 and the image-processing server 104 as separate entities. In accordance with an embodiment, functionalities of the image-processing server 104 may be implemented in the user terminal 108 without departure from the scope of the disclosure. For example, the image-processing server 104 may be implemented as an application program that runs and/or is installed on the user terminal 108. A person with ordinary skill in the art will further understand that in accordance with an embodiment, the user terminal 108 may be integrated with the medical imaging device 102. Alternatively, the user terminal 108 may be communicatively coupled to the medical imaging device 102 and a user, such as a physician, at the user terminal 108 may control the medical imaging device 102, via the user terminal 108.

The communication network 110 may include a medium through which the medical imaging device 102 and/or the user terminal 108 may communicate with one or more servers, such as the image-processing server 104. Examples of the communication network 110 may include, but are not limited to, the Internet, a cloud network, a Long Term Evolution (LTE) network, a Wireless Fidelity (Wi-Fi) network, a Wireless Local Area Network (WLAN), a Local Area Network (LAN), a plain old telephone service (POTS), and/or a Metropolitan Area Network (MAN). Various devices in the network environment 100 may be configured to connect to the communication network 110, in accordance with various wired and wireless communication protocols. Examples of such wired and wireless communication protocols may include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, cellular communication protocols, and/or Bluetooth (BT) communication protocols.

In operation, a user may provide an input at the user terminal 108, via one or more input devices, such as a keyboard, a mouse, and/or a touch-sensitive display screen. Based on the received input, a request may be generated at the user terminal 108. The generated request may be transmitted to the medical imaging device 102 by the user terminal 108, via the communication network 110. Based on the request received from the user terminal 108, the medical imaging device 102 may be activated to capture an input VID of an anatomical region of a subject, such as a human body. In accordance with an embodiment, the medical imaging device 102 may be configured to store the captured input VID in a local memory. In accordance with an embodiment, the medical imaging device 102 may be configured to transmit the captured input VID to the image database 106, via the communication network 110. In accordance with an embodiment, the medical imaging device 102 may be configured to transmit the captured input VID to the image-processing server 104, via the communication network 110.

The image-processing server 104 may be configured to receive an input VID of an anatomical region of a subject, such as human body, from the medical imaging device 102, via the communication network 110. In such a case, the medical imaging device 102 may be configured to capture the input VID, based on a request received from a user at the user terminal 108, via the communication network 110. Such captured input VID may include noise that may introduce segmentation errors.

In accordance with an embodiment, the image-processing server 104 may be configured to receive the input VID from the image database 106, via the communication network 110. In such a case, the input VID may be pre-stored at the image database 106, and may be received based on a user input provided by the user at the user terminal 108.

In accordance with an embodiment, the image-processing server 104 may be configured to perform initial segmentation on the received input VID of the anatomical region of the subject. In accordance with the initial segmentation, the image-processing server 104 may enhance the vessel structure, based on a vessel enhancement operation. The vessel enhancement operation may comprise one or more image enhancement techniques known in the art, such as top-hat transformation. In accordance with the initial segmentation, the image-processing server 104 may be further configured to process the input VID with the enhanced vessel structure to remove the scalp on the input VID with enhanced vessels.

As a result of the initial segmentation, the image-processing server 104 may generate the largest connected vessel segment from the processed VID. The largest connected vessel segment may be hereinafter referred to as "main vessel structure". The remaining portion of the VID, apart from the largest connected vessel segment, may include one or more vessel segments which may not be connected with the main vessel structure. Such a residual portion of the VID may be categorized as plurality of broken segments.

In accordance with an embodiment, the input VID may include large gradients at boundaries of anatomical structures, such as the brain of the subject, which may introduce segmentation errors. In such a case, the image-processing server 104 may be configured to remove larger gradients present in the input VID of an anatomical region of the subject. The image-processing server 104 may be configured to perform a smoothing operation on the input VID, based on one or more smoothing techniques, such as the Gaussian filter technique. The smoothing operation may filter the input VID to reduce one or more high-frequency components from the input VID. The one or more high-frequency components may create noise while one or more image-processing operations, such as gradient removal, are performed on the input VID.

The image-processing server 104 may be further configured to generate a binary VID from the smoothed VID, based on a pre-determined threshold value. The image-processing server 104 may be further configured to perform a gradient calculation operation on the smoothed VID and the binary VID. Consequently, individual gradient vector quantities for both the smoothed VID and the binary VID may be generated. The image-processing server 104 may calculate a difference between the gradient vector quantities and determines a gradient field based on the calculated vector difference, interchangeably referred to as the "gradient flow".

In accordance with an embodiment, the image-processing server 104 may be configured to refine the result of the initial segmentation of the input VID. The result of the initial segmentation of the input VID may comprise the main vessel structure and the plurality of broken segments. The image-processing server 104 may perform a weighted path computation and the connected path validation for such vessel refinement.

In accordance with the vessel refinement, the image-processing server 104 may be configured to generate a graph that may include a plurality of first nodes, a plurality of second nodes, and a plurality of edges. A first node from the plurality of first nodes may correspond to the first voxel of the main vessel structure. A second node from the plurality of second nodes may correspond to the second voxel of a broken segment of the plurality of broken segments. In accordance with an embodiment, the image-processing server 104 may be configured to infer and compute a plurality of shortest weighted paths between a first voxel of the main vessel structure and a second voxel of the plurality of broken segments. Consequently, the image-processing server 104 may be configured to generate a weighted VID. The weights of the paths may be pre-determined, based on one or more parameters associated with the voxels. The one or more parameters may comprise intensity of the first and the second set of voxels and/or a measure of similarity between a second voxel and one or more neighbor voxels associated with the second voxel of the plurality of broken segments.

The image-processing server 104 may be configured to perform a connected path validation operation on the weighted VID. The image-processing server 104 may be further configured to remove one or more invalid shortest weighted paths from the plurality of shortest weighted paths and may generate a valid set of shortest weighted paths. The valid set of weighted paths may be determined between the main vessel structures and the broken segments of the plurality of broken segments based on the computed weighted paths and one or more pre-specified conditions. The one or more valid shortest weighted paths from the plurality of shortest weighted paths may satisfy the one or more pre-defined conditions, such as a first condition and a second condition, as described in FIG. 2. In accordance with an embodiment, the generated, refined VID may represent the valid set of connections between the main vessel structure and the broken segments. Such a refined VID may be a representation of a successful segmentation of fine vascular structures of the anatomical region of the subject.

In accordance with an embodiment, the image-processing server 104 may be configured to utilize the valid set of connections as constraints, and apply one or more image segmentation algorithms known in the art, such as a graph cut algorithm, on the gradient field. This may be done to generate an output VID. Thus, the output VID may include a precise, accurate, and noise-free main vessel structure and a plurality of broken segments, connected by the valid set of shortest weighted paths.

Figure 2:
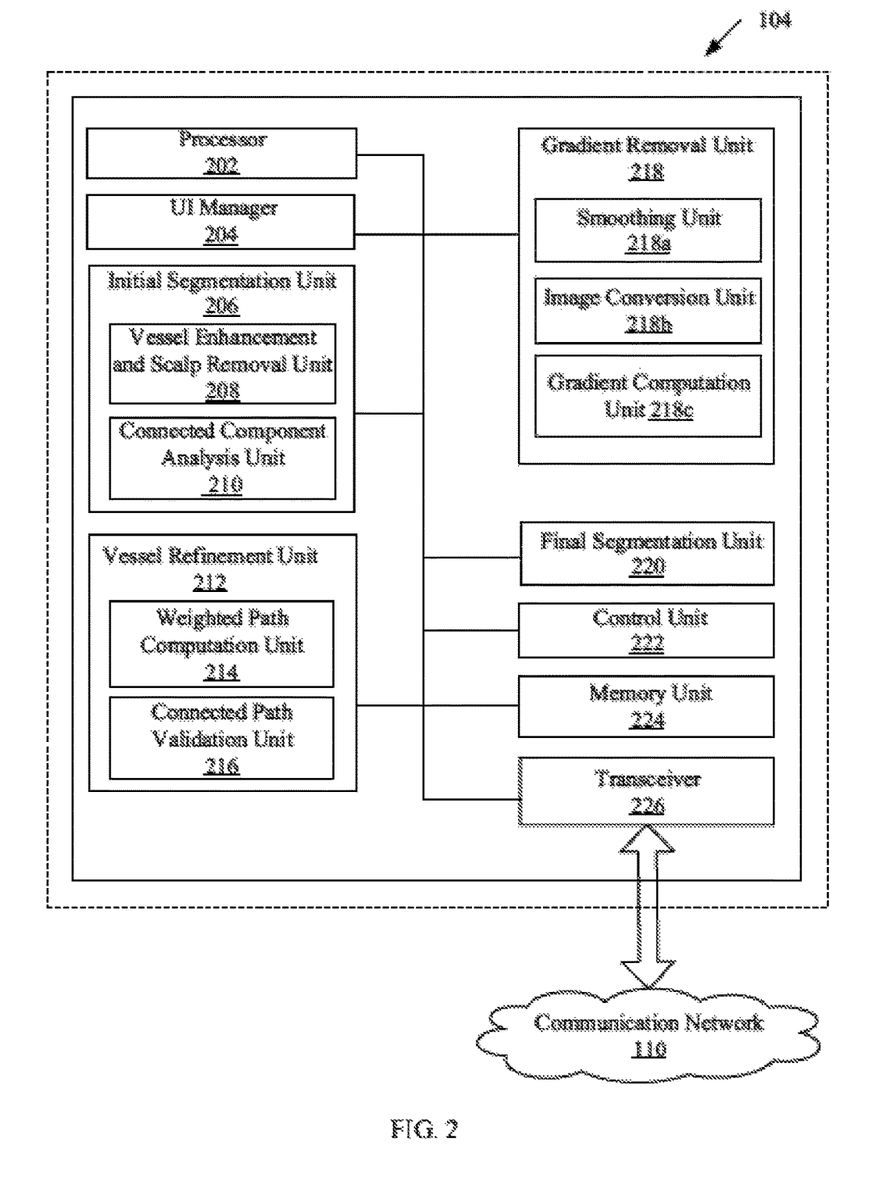
FIG. 2 illustrates a block diagram of an exemplary image-processing server for segmentation of vascular structure in a volumetric image dataset, in accordance with an embodiment of the disclosure.

FIG. 2 illustrates a block diagram of an exemplary image-processing server for segmentation of vascular structure in a volumetric image dataset (VID), in accordance with an embodiment of the disclosure. With reference to FIG. 2, there is shown the image-processing server 104 that may include a processor 202, a user interface (UI) manager 204, and an initial segmentation unit 206. The initial segmentation unit 206 may further include a vessel enhancement and scalp removal unit 208, and a connected component analysis unit 210. The image-processing server 104 may further include a vessel refinement unit 212. The vessel refinement unit 212 may further include a weighted path computation unit 214 and a connected path validation unit 216. There is further shown a gradient removal unit 218, which includes a smoothing unit 218*a*, an image conversion unit 218*b*, and a gradient computation unit 218*c*. The image-processing server 104 may further include a final segmentation unit 220, a control unit 222, a memory unit 224, and a transceiver unit 226. In accordance with an embodiment, the image-processing server 104 may be communicatively coupled with the other units, such as the medical imaging device 102, the image database 106, and the user terminal 108, via the communication network 110.

The processor 202 may comprise suitable logic, circuitry, interfaces, and/or code that may be configured to process the input VID. The processor 202 may be configured to receive the input VID from the memory unit 224. The processor 202 may be further configured to receive the input VID from external units, such as the medical imaging device 102, via the communication network 110. Based on pre-defined image-processing algorithms, the processor 202 may be configured to process the received input VID. The processor 202 may be communicatively coupled with the initial segmentation unit 206 and the vessel refinement unit 212, to process the input VID. The processor 202 may be further communicatively coupled with the UI manager 204, as well as the control unit 222.

The UI manager 204 may comprise suitable logic, circuitry, interfaces, and/or code that may be configured to display the input VID received from the processor 202, the vessel refinement unit 212, the final segmentation unit 220, the transceiver unit 226 and/or the memory unit 224. The UI manager 204 may be further configured to display a control signal generated by the control unit 222.

The initial segmentation unit 206 may comprise suitable logic, circuitry, codes and/or interfaces that may be configured to perform an initial segmentation of a vascular structure determined from the input VID of the anatomical region of the subject. The initial segmentation unit 206 may generate a segmented main vessel structure and a plurality of broken segments from the input VID.

The vessel enhancement and scalp removal unit 208 may comprise logic, circuitry, codes and/or interfaces that may be configured to enhance the vascular structure in the input VID of the anatomical region of the subject. The vessel enhancement and scalp removal unit 208 may be further configured to remove the scalp from the vascular structure in the input VID of the anatomical region.

The connected component analysis unit 210 may comprise logic, circuitry, codes and/or interfaces that may be configured to generate a largest connected vessel segment in the input VID of the anatomical region. The remaining vascular structure of the input VID may be referred to as a plurality of broken segments.

The vessel refinement unit 212 may comprise suitable logic, circuitry, codes and/or interfaces that may be configured to determine a plurality of shortest weighted paths between the first voxel of the main vessel structure and the second voxel of the plurality of broken segments. The vessel refinement unit 212 may be further configured to remove one or more invalid shortest weighted paths from the plurality of shortest weighted paths and generate a VID, which may comprise valid set of shortest weighted paths. The one or more shortest weighted paths from the plurality of shortest weighted paths, which may not satisfy one or more pre-defined conditions, may correspond to an invalid shortest weighted path.

The weighted path computation unit 214 may comprise logic, circuitry, codes and/or interfaces that may be configured to determine the plurality of shortest weighted paths between the first voxel of the main vessel structure and the second voxel of the plurality of broken segments. The weighted path computation unit 214 may further generate a graph between the first voxel of the main vessel structure and the second voxel of the plurality of broken segments based on the determined plurality of shortest weighted paths. The determination of the plurality of shortest weighted paths may be based on various parameters, such as the distance between the first voxel and the second voxel, and/or weight of a weighted path associated with the first voxel and the second voxel.

In accordance with an embodiment, the connected path validation unit 216 may comprise logic, circuitry, codes and/or interfaces that may be configured to remove one of more invalid shortest weighted paths from the plurality of shortest weighted paths, based on one or more pre-defined conditions. The connected path validation unit 216 may further generate a VID, which may comprise a valid set of shortest weighted paths, which may be intermittently referred to hereafter as "valid set of connections".

The gradient removal unit 218 may compose logic, circuitry, codes and/or interfaces that may be configured to perform gradient removal operations on the received input VID. The gradient removal operations may generate a gradient field from input VID. The gradient removal operation may perform various functions on the received input VID. The gradient removal operation functions may include a smoothing operation, an image conversion operation, and a gradient calculation and vector difference computation.

The smoothing unit 218a may comprise logic, circuitry, codes and/or interfaces that may be configured to remove one or more high-frequency components from the input VID of the anatomical region of the subject. The one or more high-frequency components may create noise in the gradient field. The image conversion unit 218b may comprise logic, circuitry, codes and/or interfaces that may be configured to generate a binary VID from the input VID of the anatomical region of the subject. The gradient computation unit 218c may comprise logic, circuitry, codes and/or interfaces that may be configured to determine a first gradient vector of a smoothed VID and a second gradient vector of the binary VID. The gradient computation unit 218c may be further configured to determine a vector difference between the first gradient vector and the second gradient vector, to remove the larger gradient from the input VID of the anatomical region of the subject.

The final segmentation unit 220 may comprise suitable logic, circuitry, codes and/or interfaces that may be configured to perform a final segmentation based on the gradient field of the anatomical region of the subject to generate the output VID 320. The final segmentation unit 220 may retain the valid set of connections as a constraint. In accordance with an embodiment, the final segmentation unit 220 may involve one or more image segmentation algorithms known in the art, such as a graph-cut algorithm. The final segmentation unit 220 may determine a boundary based on the gradient field to apply the one or more image segmentation algorithms. The boundary may correspond to a portion passed by a maximal gradient flow in the gradient field of the anatomical region of the subject.

The control unit 222 may comprise suitable logic, circuitry, interfaces, and/or code that may be configured to generate one or more control signals, based on a current state of the one or more communicatively coupled units, such as the processor 202, the UI manager 204, the initial segmentation unit 206, the vessel refinement unit 212, the final segmentation unit 220, the memory unit 224, and/or the transceiver unit 226. The control unit 222 may be used to synchronize the operation between the one or more communicatively coupled units. The current state of the one or more communicatively coupled units may be, for example, whether a unit is ready to perform an operation or not. The one or more control signals may include signals such as busy signal, wait signal, start signal and/or the like.

The memory unit 224 may comprise suitable logic, circuitry, and/or interfaces that may be configured to store a machine code and/or a computer program with at least one code section executable by the processor 202. In accordance with an embodiment, the memory unit 224 may be further configured to store the input VID captured by the medical imaging device 102, via the transceiver unit 226. Examples of types of the memory unit 224 may include, but are not limited to, Random Access Memory (RAM), Read Only Memory (ROM), Hard Disk Drive (HDD), and/or a Secure Digital (SD) card.

The transceiver unit 226 may comprise suitable logic, circuitry, interfaces, and/or code that may be configured to transmit as well as receive the input volumetric image data to/from the one or more communicatively coupled units, such as the processor 202, the UI manager 204, the initial segmentation unit 206, the vessel refinement unit 212, the final segmentation unit 220, and/or the memory unit 224. The transceiver unit 226 may be configured to communicate with the user terminal 108 and/or the medical imaging device 102, via the communication network 110, as shown in FIG. 1. The transceiver unit 226 may be implemented by technologies known in the art, to support wired or wireless communication of the image-processing server 104, with the communication network 110. Various components of the transceiver unit 226 may include, but are not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer.

In operation, the transceiver unit 226 within the image-processing server 104 may be configured to receive an input VID of an anatomical region of a subject, such as a human body, from the medical imaging device 102, via the communication network 110. In such a case, the medical imaging device 102 may be configured to capture the input VID, based on a request received from a user at the user terminal 108, via the communication network 110. Such captured input VID may include noise that may introduce segmentation errors.

In accordance with an embodiment, the transceiver unit 226 may be configured to receive the input VID from the image database 106, via the communication network 110. In such a case, the input VID may be pre-stored at the image database 106, and may be received based on the user input provided by the user at the user terminal 108.

In accordance with an embodiment, the transceiver unit 226 may be configured to communicate the received input VID to the processor 202. In accordance with an embodiment, the processor 202 may be configured to receive the input VID from the memory unit 224. In such a case, the input VID may be stored temporarily at the memory unit 224. The processor 202 may communicate the received input VID to the initial segmentation unit 206.

In accordance with an embodiment, the processor 202 communicates the captured input VID to both the initial segmentation unit 206 and the smoothing unit 218a. The initial segmentation unit 206, in conjunction with the processor 202, may be configured to receive the input VID. The initial segmentation unit 206 may include the vessel enhancement and scalp removal unit 208 and the connected component analysis unit 210.

The vessel enhancement and scalp removal unit 208 may be configured to process the received input VID of the anatomical region of the subject to enhance the vessel structure. In accordance with an embodiment, the vessel enhancement operation may comprise one or more image enhancement techniques known in the art, such as top-hat transformation, bottom-hat transformation, opening morphology, closing morphology and histogram equalization. The vessel enhancement and scalp removal unit 208 may be further configured to process the input VID with the enhanced vessel structure, to remove the scalp in the input VID with enhanced vessels. In accordance with an embodiment, the scalp removal operation may comprise one or more scalp removal techniques known in the art. The scalp removal operation may include scalp localization, based on various image-based methods known in the art, such as reference to anatomical landmarks or radiographic baselines, external radiopaque markers placed on the scalp, stereotactic frames, and frameless surgical navigators. Once the scalp is localized, the scalp removal operation may implement a sequence of morphological operations, known in the art to remove the scalp voxels from the input VID. The scalp removal operation may be further based on one or more parameters, such as a distance to the head boundary.

The connected component analysis unit 210, in conjunction with the processor 202, may be configured to receive a processed VID from the vessel enhancement and scalp removal unit 208. The connected component analysis unit 210 may be further configured to determine a largest connected vessel segment in me processed VID received from the vessel enhancement and scalp removal unit 208. The connected component analysis unit 210 may utilize one or more algorithms, such as a two-pass algorithm, to identify the largest connected vessel segment in the received VID. The largest connected vessel segment may be hereinafter referred to as the "main vessel structure". In accordance with an embodiment, one or more vessel segments, which may not be connected with the main vessel structure, may be hereinafter referred to as the "plurality of broken segments".

In accordance with an embodiment, the input VID may include large gradients at boundaries of the anatomical structures, such as the brain of the subject. Further, cerebrospinal fluids preset in the anatomical structures may introduce segmentation errors. In such a case, the gradient removal unit 218 may be configured to remove larger gradients present in the input VID of a given anatomical region of a subject, such as a human body. The smoothing unit 218a, in conjunction with the processor 202, may be configured to perform a smoothing operation on the input VID. The smoothing unit 218a may perform the smoothing operation, based on one or more smoothing techniques known in the art, such as Gaussian filter technique. In accordance with an embodiment, the smoothing operation may filter the input VID to reduce one or more high-frequency components from the input VID. The one or more high-frequency components may create noise while one or more image-processing operations, such as gradient removal, are performed on the input VID.

The image conversion unit 218b, in conjunction with the processor 202, may be configured to receive a smoothed VID from the smoothing unit 218a. In accordance with an embodiment, the image conversion unit 218b may be further configured to generate a binary VID from the smoothed VID. The binary VID may be generated based on a pre-determined threshold value, that may be expressed mathematically by equation (1), as follows:

$$Th = t_2 + (t_{98} - t_2) \times 0.4 \quad (1)$$

where "$t_2$" is an intensity below which ties "2 percent" of a cumulative histogram, and "$t_{98}$" is an intensity below which lies "98 percent" of a cumulative histogram.

In accordance with an embodiment, the gradient computation unit 218c may be configured to perform a gradient calculation operation on the smoothed VID received from the smoothing unit 218a. The gradient computation unit 218c may be further configured to perform a gradient calculation operation on the binary VID received from the image conversion unit 218b. The gradient computation unit 218c may generate individual gradient vector quantities for both the smoothed VID and the binary VID. In an instance, the angles between the generated individual gradient vector quantities for the smoothed VID and the binary VID are of small value. Such generated individual gradient vector quantities may be located at a boundary of brain tissue and cerebrospinal fluids in the anatomical region and may introduce segmentation errors. The gradient vector quantity for the smoothed VID may be expressed by a first gradient vector, such as "$\nabla 1$". The gradient vector quantity for the binary VID may be expressed by a second gradient vector, such as "$\nabla 2$" whose projection on the first gradient vector "$\nabla 1$" may be mathematically represented as "cos θ", where, "θ" represents an angle of the direction difference between the gradient vector quantities "$\nabla 1$" and "$\nabla 2$". Accordingly, the gradient computation unit 218c may generate a gradient field, such as "$\nabla$", represented by equation (2), as follows:

$$\nabla = (1 - \cos \theta) \nabla 1 \quad (2)$$

In accordance with an embodiment, the processor 202, in conjunction with the gradient computation unit 218c, may generate the gradient field for final segmentation. The vessel refinement unit 212, in conjunction with the processor 202, may be configured to receive the segmented VID that comprises the main vessel structure and the plurality of broken segments from the initial segmentation unit 206. The vessel refinement unit 212 may further include the weighted path computation unit 214 and the connected path validation unit 216.

In accordance with an embodiment, the weighted path computation unit 214 may be configured to generate a graph that may include a plurality of first nodes, a plurality of second nodes, and a plurality of edges. A first node from the plurality of first nodes may correspond to the first voxel of the main vessel structure. A second node from the plurality of second nodes may correspond to the second voxel of a broken segment of the plurality of broken segments. The first and the second set of voxels may correspond to a unit of graphic information that may define a point in three-dimensional space. In accordance with an embodiment, the weighted path computation unit 214 may be further configured to infer and compute a plurality of shortest weighted paths between a first voxel of the main vessel structure and a second voxel of the plurality of broken segments. In accordance with an embodiment, the shortest weighted path may be determined by one or more shortest-path algorithms known in the art, such as Dijkstra's algorithm.

The plurality of edges between the first set of voxels of the main vessel structure and the second set of voxels of each broken segment of the plurality of broken segments may be based on the shortest weighted path. In accordance with an embodiment, the shortest weighted path may comprise a path with a minimum length and a maximum assigned weight. The weight may be pre-determined based on one or more parameters associated with the voxels. The one or more parameters may comprise intensity of the first and second set of voxels. The one or more parameters may comprise a measure of similarity between a second voxel and one or more neighbor voxels associated with the second voxel of the plurality of broken segments.

The connected path valuation unit 216, in conjunction with the processor 202, may be configured to receive a weighted VID from the weighted path computation unit 214, to generate a refined VID. In accordance with an embodiment, the connected path validation unit 216 may be further configured to perform a connected path validation operation on the weighted VID received from the weighted path computation unit 214. The connected path validation unit 216 may be further configured to remove one or more invalid shortest weighted paths from the plurality of shortest weighted paths, and generate a valid set of shortest weighted paths. The valid set of weighted paths may be interchangeably referred to as a valid set of connections. The valid set of weighted paths may be determined between the main vessel structure and the broken segments of the plurality of broken segments, based on the computed weighted paths and one or more pre-specified conditions. The one or more valid shortest weighted paths from the plurality of shortest weighted paths may satisfy the one or more pre-defined conditions, such as a first condition and a second condition. In accordance with the first condition, lengths of the broken segments exceed a length of the computed weighted path. The first condition may be mathematically expressed as, "Condition 1", as follows:

Condition 1: $L_b > L_{wp}$ where, "$L_b$" may be the length of one or more broken segments of plurality of broken segments, and "$L_{wp}$" may be the length of the one or more shortest weighted paths associated with the one or more broken segments of the plurality of broken segments and main vessel structure.

In accordance with the second condition, angles between the computed weighted paths and the main vessel structure are less than a pre-defined threshold angle value. The second condition may be mathematically expressed as, "Condition 2", as follows:

Condition 2: $\theta < \theta th$ where "$\theta$" corresponds to angles between the one or more shortest weighted paths and the main vessel structure, and "$\theta th$" may be a pre-determined threshold angle value. Thus, the connected path validation unit 216 may be configured to invalidate the shortest weighted paths that fail to satisfy the one or more conditions, such as, "Condition 1" and "Condition 2". In accordance with an embodiment, the refined VID generated by the connected path validation unit 216 may represent the valid set of connections between the main vessel structure and the broken segments. Such a refined VID may be a representation of a successful segmentation of fine vascular structures of the anatomical region of the subject.

The final segmentation unit 220, in conjunction with the processor 202, may be configured to receive the valid set of shortest weighted paths generated by the vessel refinement unit 212. The final segmentation unit 220, in conjunction with the processor 202, may be configured to apply one or more image segmentation algorithms known in the art, such as a graph cut algorithm, to generate an output VID 320. The final segmentation unit 220 may utilize the valid set of shortest weighted paths as constraints and apply graph cuts on the gradient field outputted by the gradient computation unit 218c of the gradient removal unit 218 by finding the boundaries passed by the maximal gradient flow. Thus, the output VID 320 may include a noise-free main vessel structure and a plurality of broken segments, connected by the valid set of shortest weighted paths.

Figure 3A:
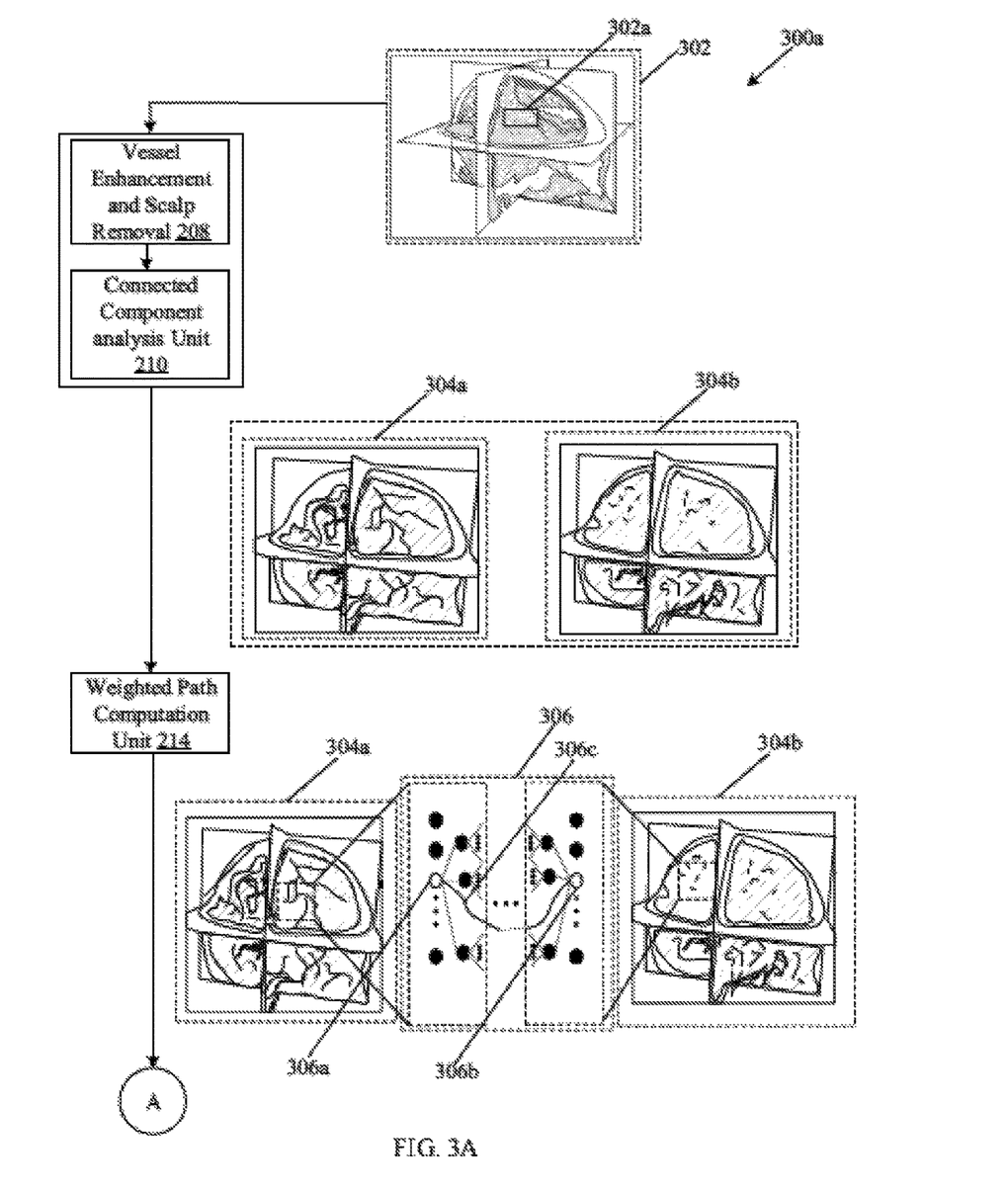
FIGS. 3A to 3D, collectively, illustrate an exemplary scenario for implementation of the method and system for segmentation of vascular structure in a volumetric image dataset, in accordance with an embodiment of the disclosure.
Figure 3B:
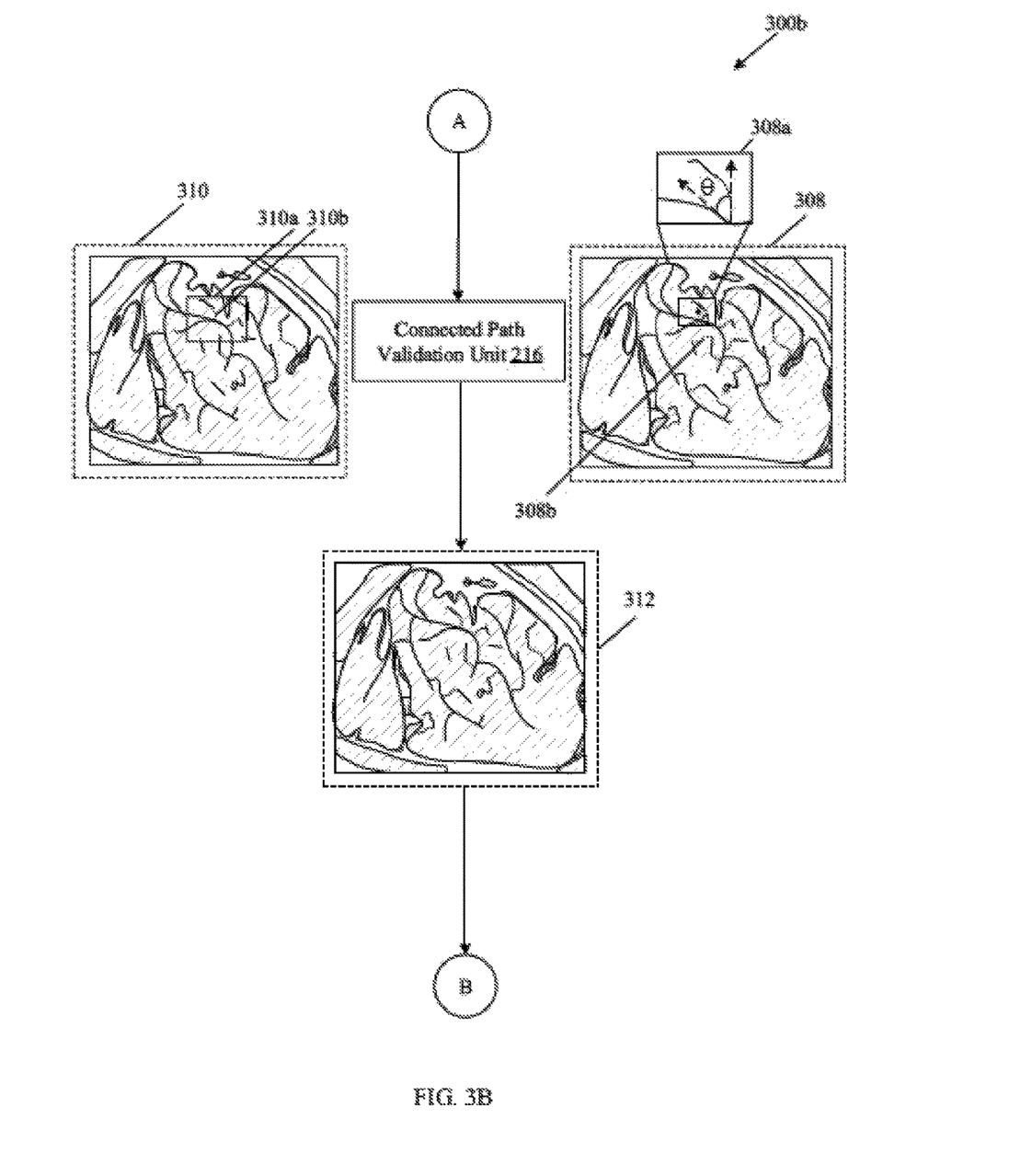

FIGS. 3A to 3D collectively illustrate an exemplary scenario for implementation of the disclosed exemplary segmentation of vascular structure in a volumetric image dataset (VID), in accordance with an embodiment of the disclosure. FIGS. 3A to 3D are explained in conjunction with FIG. 1 and FIG. 2. With reference to FIGS. 3A and 3B, there is shown arrangements 300a and 300b of various components of the image-processing server 104, as described in FIG. 2. There is further shown an input VID 302 of an anatomical structure, such as a human brain. The input VID 302 may include one or more regions, such as a region 302a, that corresponds to blood vessels of the anatomical structure. There is further shown a main vessel structure 304a and a plurality of broken segments 304b. There is further shown a graph 306, which includes a plurality of nodes that correspond to a first and a second set of voxels. The first set of voxels may correspond to the main vessel structure 304a and the second set of voxels may correspond to the plurality of broken segments 304b. The first and the second set of voxels may include a plurality of voxels. A voxel from the first set of voxels may be represented by 306a and another voxel from the second set of voxels may be represented by 306b, respectively. The graph 306 may further include a plurality of shortest weighted paths; one of such plurality of shortest weighted paths is represented as 306c. There is further shown a first VID 308 that illustrates a first pre-specified condition, and a second VID 310, which illustrates a second pre-specified condition. There is further shown a refined VID 312 that includes a valid set of shortest weighted paths.

In accordance with the exemplary scenario, an initial segmentation may be performed on the received input VID 302 of the anatomical structure by the combination of the vessel enhancement and scalp removal unit 208 and the connected component analysis unit 210. Specifically, the vessel enhancement and scalp removal unit 208 may be configured to use one or more image enhancement techniques, such as top-hat filtering, to enhance the intensity of a region 302a, which corresponds to blood vessels of the anatomical structure. In accordance with an embodiment, the vessel enhancement and scalp removal unit 208 may be further configured to remove scalp portion from the received input VID 302 after the vessel enhancement, based on one or more scalp removal techniques, as described in FIG. 2.

Based on the enhanced VID received from the vessel enhancement and scalp removal unit 208, the connected component analysis unit 210 may be configured to determine the main vessel structure 304a, based on one or more algorithms, such as two-pass algorithm. In accordance with an embodiment, the connected component analysis unit 210 may be further configured to determine the plurality of broken segments 304b.

The vessel refinement of the fine vessel structure may be performed. In accordance with the vessel refinement of the fine vessel structure, the weighted path computation unit 214 may be configured to receive the main vessel structure 304a and the plurality of broken segments 304b from the connected component analysis unit 210. The weighted path computation unit 214 may be configured to generate the graph 306 between the first set of voxels (which includes at least the first voxel 306a) that correspond to the main vessel structure 304a and the second set of voxels (which includes at least the second voxel 306b) that correspond to the plurality of broken segments 304b. In accordance with an embodiment, the graph 306 may be represented by a plurality of nodes and a plurality of edges. The plurality of nodes may correspond to the first and the second set of voxels. The plurality of edges may correspond to the plurality of shortest weighted paths, such as the shortest weighted path 306c between the first voxel 306a and the second voxel 306b. In accordance with an embodiment, the plurality of shortest weighted paths may be determined by one or more shortest-path algorithms, such as Dijkstra's algorithm. In accordance with an embodiment, a weight associated with each shortest weighted path may be pre-determined based on one or more parameters, such as intensity and/or similarity between the neighbor voxels.

Each of the plurality of shortest weighted paths may be either valid or invalid based on one or more pre-specified conditions, as described in FIG. 2. The connected path validation unit 216 may determine such validity or invalidity of the computed shortest weighted paths. In accordance with the first condition, the connected path validation unit 216, in conjunction with the processor 202, may be configured to determine that length of the broken segment exceeds length of the computed weighted path, as shown in region 310*a*. Thus, the computed weighted path 310*b* may be a valid computed weighted path. In accordance with the second condition, the connected path validation unit 216, in conjunction with the processor 202, may be configured to determine that an angle between the computed weighted path 310*b* and the main vessel structure 304*a*, is less than a pre-defined threshold angle value, such as, "60 degrees", as shown in region 308*a*. Thus, the computed weighted path 310*b* may be a valid computed weighted path. Accordingly, the connected path validation unit 216 may be configured to validate the shortest weighted paths, such as the computed weighted path 310*b*, which satisfies the first and the second conditions. Further, the connected path validation unit 216 may be configured to invalidate the shortest weighted paths, such as the computed weighted path 308*b*, which fails to satisfy both the first and the second conditions. In accordance with an embodiment, the refined VID 312, generated by the connected path validation unit 216, may represent the valid set of connections between the main vessel structure 304*a* and the plurality of broken segments 304*b*. Such refined VID 312 may be a representation of a successful segmentation of fine vascular structures of the anatomical structure.

Figure 3C:
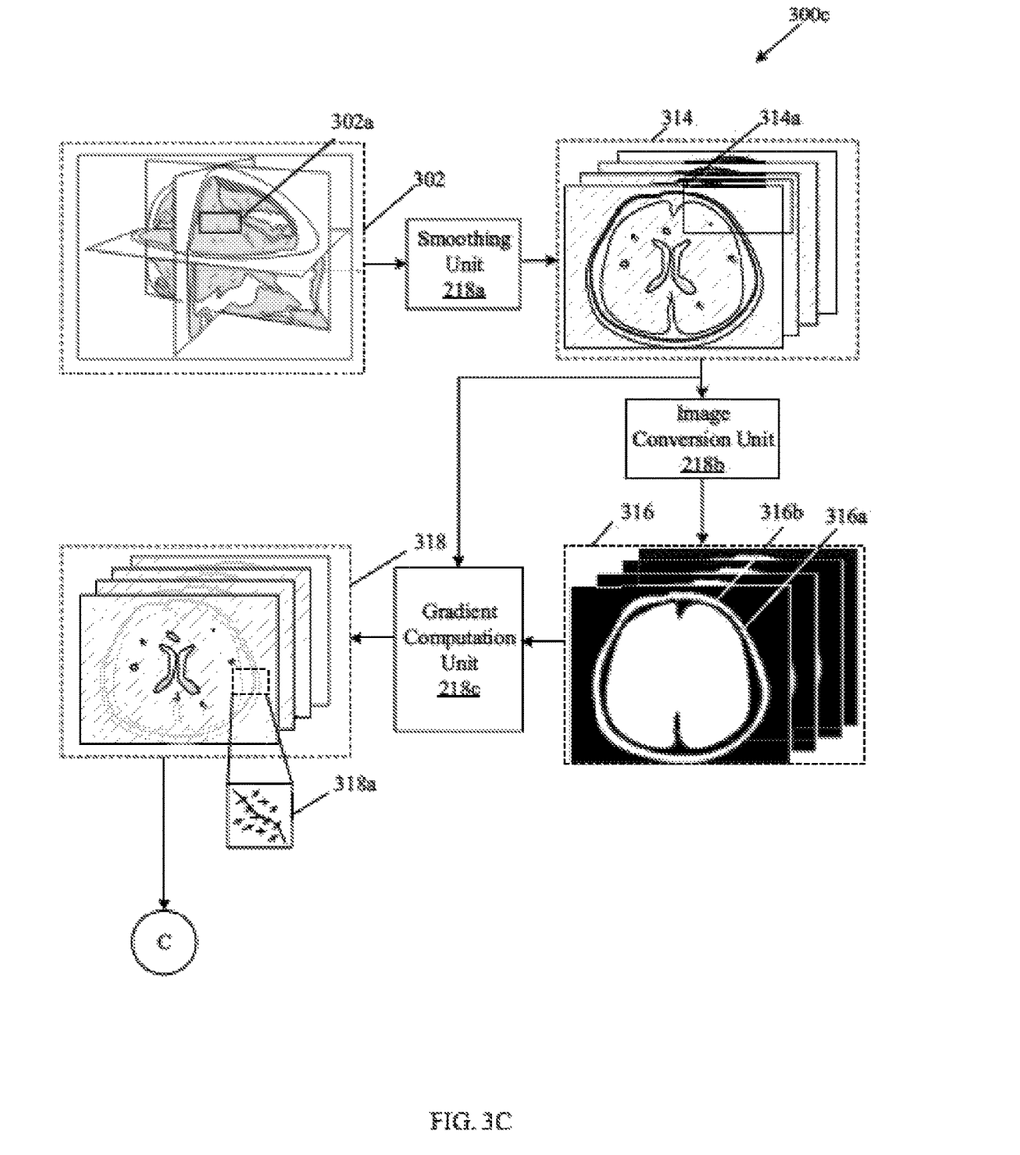

With reference to FIG. 3C, there is shown an arrangement 300*c* of various components of the image-processing server 104, as described in FIG. 2. The arrangement 300*c* illustrates a smoothed VID 314, a binary VID 316, and a gradient field 318. The binary VID 316 includes a shaded region 316*a* and a non-shaded region 316*b*. The gradient field 318 includes a region 318*a* that shows a portion of gradient field.

In accordance with the exemplary scenario, the smoothing unit 218*a* may receive the input VID 302 when the input VID 302 contains noise. The noise that corresponds to high-frequency components in the input VID 302 may be induced by various intrinsic and extrinsic factors, such as the halo effect, the medical imaging device 102, sudden movements of the subject, excessive illumination, and/or the like. The smoothing unit 218*a* may be configured to remove such high-frequency components from the received input VID 302, based on one or more smoothing techniques, such as the Gaussian filtering algorithm. The smoothing unit 218*a* may be configured to generate the smoothed VID 314. In accordance with an embodiment, the gradient in the region 314*a* in the smoothed VID 314 may represent a directional change in the intensity or color of neighbor pixels.

Subsequently, the image conversion unit 218*b* may be configured to convert the smoothed VID 314 into the binary VID 316, based on a pre-determined threshold value, as described in FIG. 2. The image conversion unit 218*b* may be configured to determine voxel intensity of a region-of-interest that corresponds to the shaded region 316*a*, with a first pre-defined intensity value. The image conversion unit 218*b* may be configured to determine voxel intensity of the residual region that corresponds to the non-shaded region 316*b*. The non-shaded region may be denoted with a second pre-defined intensity value. The shaded region 316*a* may correspond to one or more portions in the smoothed VID 314 where the vascular structure may be located.

Based on the smoothed VID 314, the gradient computation unit 218*c* may determine a first gradient vector. Similarly, based on the binary VID 316, the gradient computation unit 218*c* may determine a second gradient vector. The processor 202, in conjunction with the gradient computation unit 218*c*, may determine the angle between the two gradient vectors and compute the gradient field 318 as input to the final segmentation unit 220.

Figure 3D:
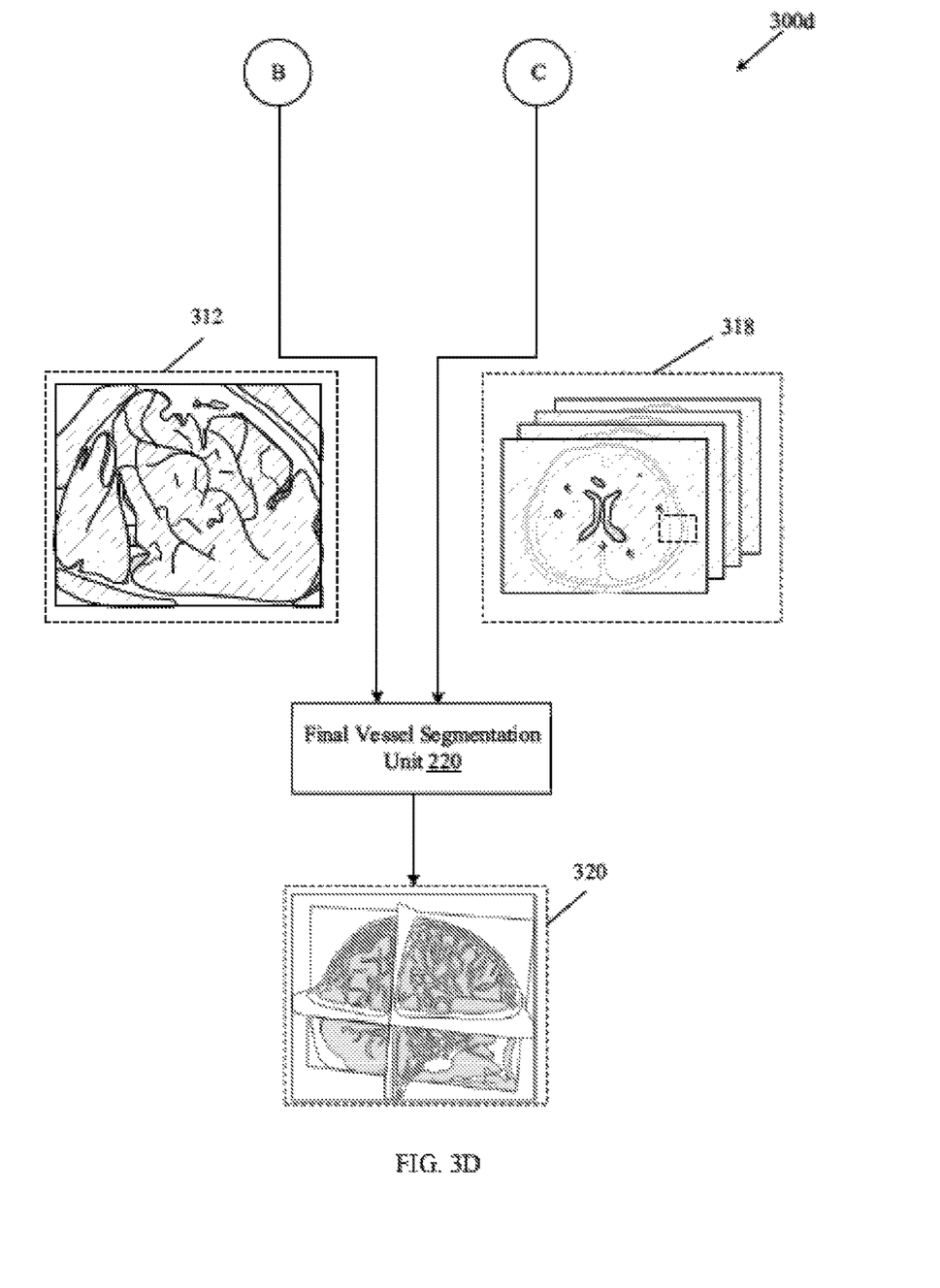

With reference to FIG. 3D, there is shown an arrangement 300*d* of various components of the image-processing server 104, as described in FIG. 2. The arrangement 300*d* illustrates an output VID 320, generated by the final segmentation unit 220 based on the gradient field 318 and the refined VID 312. The final segmentation unit 220 may apply one or more image segmentation algorithms, such as a graph cut algorithm, on the gradient field 318 by finding the boundaries passed by maximal gradient flow to generate the output VID 320. Further, the final segmentation unit 220 may also apply the valid set of shortest weighted paths, as constraints, to generate the output VID 320. The output VID 320 may comprise a fine vascular structure of the anatomical structure of the subject.

Figure 4:
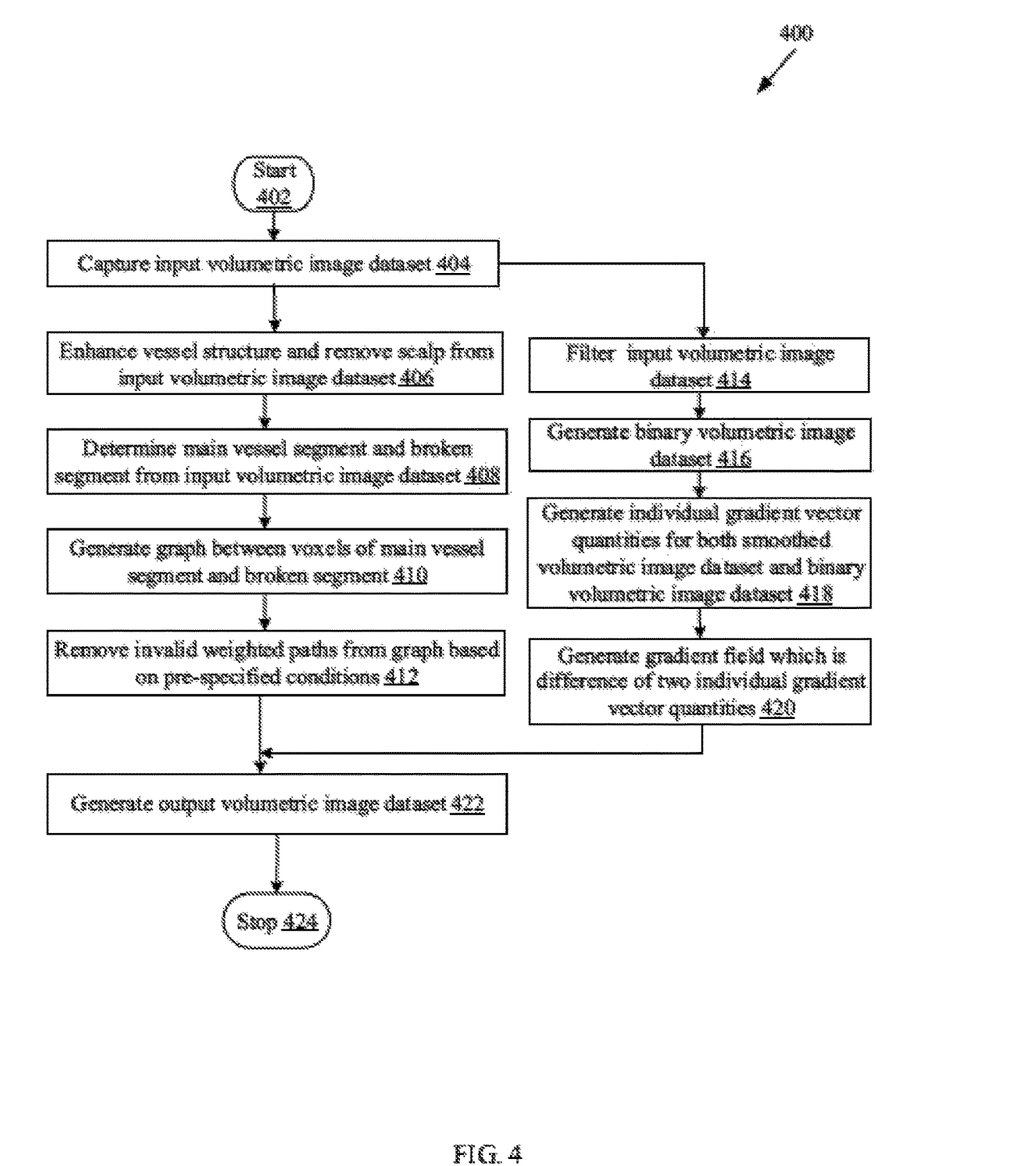
FIG. 4 illustrates a flow chart for implementation of an exemplary method for segmentation of vascular structure in a volumetric image dataset, in accordance with an embodiment of the disclosure.

FIG. 4 illustrates a flow chart for implementation of an exemplary method for segmentation of vascular structure in a volumetric image dataset (VID), in accordance with an embodiment of the disclosure. FIG. 4 is described in conjunction with elements of FIGS. 1, 2, and 3A to 3D. The method, in accordance with the flowchart 400 in FIG. 4, may be implemented in the image-processing server 104, which may be communicatively coupled to the medical imaging device 102, and the image database 106, as described in FIG. 1.

With reference to FIG. 4, the method, in accordance with the flowchart 400, begins at step 402 and proceeds to step 404. At step 404, input VID 302 may be captured by the medical imaging device 102. The input VID 302 may comprise an anatomical portion of a subject (such as a human body). Control passes to both steps 406 and 414 simultaneously.

At step 406, the captured vessel structure in the input VID 302 may be enhanced by the vessel enhancement and scalp removal unit 208. The vessel enhancement and scalp removal unit 208 may further remove the scalp from the VID.

At step 408, a largest connected vessel segment, such as the main vessel structure, and a plurality of broken segments may be determined by the connected component analysis unit 210. At step 410, a graph that may include a plurality of first nodes, a plurality of second nodes, and a plurality of edges, may be generated by the weighted path computation unit 214. A first node from the plurality of first nodes may correspond to the first voxel of the main vessel structure. A second node from the plurality of second nodes may correspond to the second voxel of a broken segment of the plurality of broken segments. The weighted path computation unit 214 may be further configured to infer and compute a plurality of shortest weighted paths between a first voxel of the main vessel structure and a second voxel of the plurality of broken segments.

At step 412, a connected path validation operation on the weighted VID received from the weighted path computation unit 214 may be performed by the connected path validation unit 216. The connected path validation unit 216 may be further configured to remove one or more invalid shortest weighted paths from the plurality of shortest weighted paths and generate a valid set of shortest weighted paths. The valid set of weighted paths may be determined between the main vessel structure and the broken segments of the plurality of broken segments based on the computed weighted paths and one or more pre-specified conditions, as described in FIG. 2. Control passes to step 422.

At step 414, the input VID may be filtered to remove or reduce one or more high-frequency components from the input VID by the smoothing unit 218a. The one or more high-frequency components create noise while one or more image-processing operations, such as gradient removal, are performed on the input VID. At step 416, a binary VID may be generated from the smoothed VID. The binary VID may be generated based on a pre-determined threshold value that may be expressed mathematically by the equation (1), as described in FIG. 2. At step 418, a gradient calculation operation may be performed by the gradient computation unit 218c on the smoothed VID received from the smoothing unit 218a. The gradient computation unit 218c may be configured to perform the gradient calculation operation on the binary VID to generate individual gradient vector quantities for both the smoothed VID and the binary VID.

At step 420, a gradient field, which is the difference of the two individual vector quantities, may be generated by the gradient computation unit 218c. The gradient field may be inputted to the final segmentation unit 220. At step 422, one or more image segmentation algorithms, such as a graph cut algorithm, and the valid set of shortest weighted paths, as constraints (from step 414), may be applied on the gradient field (from step 412) to generate the output VID. The output VID may include a noise-free main vessel structure and a plurality of broken segments, connected by the valid set of shortest weighted paths. Control passes to end step 424.

In accordance with an embodiment of the disclosure, the system for segmentation of VID may comprise the image-processing server 104 (FIG. 1) communicatively coupled to the medical imaging device 102 (FIG. 1). The image-processing server 104 may comprise one or more processors, such as the processor 202 (FIG. 2), the initial segmentation unit 206 (FIG. 2), the vessel refinement unit 212 (FIG. 2), and the final segmentation unit 220 (FIG. 2). The initial segmentation unit 206 may perform an initial segmentation of the input VID 302 to obtain the main vessel structure 304a and the plurality of broken segments 304b. The vessel refinement unit 212 may compute a weighted path between the main vessel structure and a broken segment of the plurality of broken segments, based on at least one or more parameters associated with a first voxel of the broken segment of the plurality of broken segments and a second voxel of the main vessel structure. The vessel refinement unit 212 may further determine a valid weighted path between the main vessel structure 304a and the broken segment of the plurality of broken segments 304b, based on the computed weighted path and one or more pre-specified conditions. The final segmentation unit 220 may perform a final segmentation of the gradient field 318 (FIG. 3C), and generate the output VID 320 (FIG. 3D) based on the determined valid weighted path.

Various embodiments of the disclosure may provide a non-transitory computer or machine readable medium and/or storage medium, with a machine code and/or a computer program with at least one code section stored thereon and executable by the computer and/or the machine for segmentation of a volumetric image dataset (VID). The at least one code section in an image-processing device may cause the machine and/or computer to perform the steps that comprises performance of an initial segmentation of the input VID 302 to obtain the main vessel structure 304a and the plurality of broken segments 304b. A weighted path may be computed between the main vessel structure and a broken segment of the plurality of broken segments based on at least one or more parameters associated with a first voxel of the broken segment of the plurality of broken segments and a second voxel of the main vessel structure. A valid weighted path may be determined between the main vessel structure 304a and the broken segment of the plurality of broken segments 304b based on the computed weighted path and one or more pre-specified conditions. Based on the determined valid weighted path, a final segmentation of the gradient field 318 (FIG. 3C) may be performed and the output VID 320 (FIG. 3D) may be generated.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system that has an information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made and equivalents may be substituted without departure from the scope of the present disclosure. In addition, many modifications may be made to adapt a particular situation or material to the teachings of the present disclosure without departure from its scope. Therefore, it is intended that the present disclosure not be limited to the particular embodiment disclosed, but that the present disclosure will include all embodiments that falls within the scope of the appended claims.

What is claimed is:

1. A method for segmentation of a volumetric image dataset, said method comprising:
    performing, by an image-processing device, an initial segmentation of an input volumetric image dataset to obtain a main vessel structure and a plurality of broken segments;
    computing, by said image-processing device, a weighted path between said main vessel structure and a broken segment of said plurality of broken segments based on at least one or more parameters associated with a first voxel of said broken segment of said plurality of broken segments and a second voxel of said main vessel structure;
    determining, by said image-processing device, a valid weighted path between said main vessel structure and a broken segment of said plurality of broken segments based on said computed weighted path and one or more pre-specified conditions; and generating, by said image-processing device, an output volumetric image dataset by performing a final segmentation on a gradient field based on said determined valid weighted path.

2. The method of claim 1, further comprising enhancing, by said image-processing device, said input volumetric image dataset by using one or more image enhancement techniques, wherein said one or more image enhancement techniques comprise top-hat transformation, bottom-hat transformation, opening morphology, closing morphology and histogram equalization.

3. The method of claim 1, further comprising performing, by said image-processing device, a scalp removal operation on said input volumetric image dataset based on a distance to head boundary criteria.

4. The method of claim 1, further comprising:
filtering, by said image-processing device, said input volumetric image dataset to obtain a smoothed volumetric image dataset;
converting, by said image-processing device, said smoothed volumetric image dataset to a binary volumetric image dataset based on a pre-defined threshold value; and
determining, by said image-processing device, a vector difference between a first gradient vector that corresponds to said smoothed volumetric image dataset and a second gradient vector that corresponds to said binary volumetric image dataset.

5. The method of claim 4, further comprising generating said gradient field based cm said determined vector difference.

6. The method of claim 1, further comprising generating, by said image-processing device, a graph comprising a plurality of first nodes, a plurality of second nodes, and a plurality of edges, wherein a first node from said plurality of first nodes correspond to said first voxel of said broken segment of said plurality of broken segments, and wherein a second node from said plurality of second nodes correspond to said second voxel of said main vessel structure, wherein each of said plurality of edges correspond to said computed weighted path.

7. The method of claim 1, wherein said one or more parameters comprise an intensity of said first voxel, an intensity of said second voxel, and a measure of similarity between said first voxel and one or more neighboring voxels associated with said first voxel.

8. The method of claim 1, wherein said computed valid weighted path is a shortest path between said first voxel of said main vessel structure and said second voxel of said broken segment.

9. The method of claim 1, wherein said broken segment of said plurality of broken segments is connected to said main vessel structure via said computed valid weighted path.

10. The method of claim 1, wherein said one or more pre-specified conditions comprise a first condition based on which a length of said broken segment exceeds a length of said computed weighted path.

11. The method of claim 1, wherein said one or more pre-specified conditions further comprise a second condition based on which an angle between said computed weighted path and said main vessel structure is less than a pre-defined threshold angle value.

12. A system for segmentation of a volumetric image dataset, said system comprising:
one or more circuits in an image-processing device, said one or more circuits being configured to:
perform an initial segmentation of an input volumetric image dataset to obtain a main vessel structure and a plurality of broken segments;
compute a weighted path between said main vessel structure and a broken segment of said plurality of broken segments based on at least one or more parameters associated with a first voxel of said broken segment of said plurality of broken segments and a second voxel of said main vessel structure;
determine a valid weighted path between said main vessel structure and a broken segment of said plurality of broken segments based on said computed weighted path and one or more pre-specified conditions; and
generate an output volumetric image dataset by performing a final segmentation on a gradient field based on said determined valid weighted path.

13. The system of claim 12, said one or more circuits being configured to:
enhance said input volumetric image dataset by using one or more image enhancement techniques; and
perform a scalp removal operation on said input volumetric image dataset based on a distance to head boundary condition.

14. The system of claim 12, said one or more circuits being configured to:
filter said input volumetric image dataset to obtain a smoothed volumetric image dataset;
threshold said smoothed volumetric image dataset to obtain a binary volumetric image dataset based on a pre-defined threshold value; and
determine a vector difference between a first gradient vector that corresponds to said smoothed volumetric image dataset and a second gradient vector that corresponds to said binary volumetric image dataset.

15. The system of claim 14, wherein said one or more circuits being configured to generate said gradient field based on said determined vector difference.

16. The system of claim 12, wherein said one or more circuits being configured to generate a graph comprising a plurality of first nodes, a plurality of second nodes, and a plurality of edges, wherein a first node from said plurality of first nodes correspond to said first voxel of said broken segment of said plurality of broken segments, and wherein a second node from said plurality of second nodes correspond to said second voxel of said main vessel structure, wherein each of said plurality of edges correspond to said computed weighted path.

17. The system of claim 14, wherein said computed valid weighted path is a shortest path between said first voxel of said broken segment and said second voxel of said main vessel structure, wherein said broken segment of said plurality of broken segments is connected to said main vessel structure via said computed valid weighted path.

18. The system of claim 14, wherein said one or more pre-specified conditions comprise a first condition based on which a length of said broken segment exceeds a length of said computed weighted path.

19. The system of claim 14, wherein said one or more pre-specified conditions further comprise a second condition based on which an angle between said computed weighted path and said main vessel structure is less than a pre-defined threshold angle value.

20. A non-transitory computer readable storage medium having stored thereon, a set of computer-executable instructions for causing a computer to perform steps comprising:

performing, by an image-processing device, an initial segmentation of an input volumetric image dataset to obtain a main vessel structure and a plurality of broken segments;

computing, by said image-processing device, a weighted path between said main vessel structure and a broken segment of said plurality of broken segments based on at least one or more parameters associated with a first voxel of said broken segment of said plurality of broken segments and a second voxel of said main vessel structure;

determining, by said image-processing device, a valid weighted path between said main vessel structure and a broken segment of said plurality of broken segments based on said computed weighted path and one or more pre-specified conditions; and generating, by said image-processing device, an output volumetric image dataset by performing a final segmentation on a gradient field based on said determined valid weighted path.

* * * * *